(12) United States Patent
Voit

(10) Patent No.: US 6,256,180 B1
(45) Date of Patent: *Jul. 3, 2001

(54) APPARATUS FOR ENABLING SYSTEM OPERATION

(75) Inventor: Paul J. Voit, Coon Rapida, MN (US)

(73) Assignee: Micron Technology, Inc., Boise, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/258,230

(22) Filed: Feb. 26, 1999

(51) Int. Cl.[7] ........................... H02H 7/00
(52) U.S. Cl. ........................... 361/18; 361/87
(58) Field of Search ............... 361/62, 78, 18, 361/67, 87; 307/11, 18, 38, 39, 85, 86; 327/18; 340/146.2, 540, 635, 686, 825, 825.16, 825.06, 825.22, 825.56; 710/100–104, 107; 713/330, 340, 2

(56) References Cited

U.S. PATENT DOCUMENTS

| | | | |
|---|---|---|---|
| 5,572,685 | * | 11/1996 | Fisher et al. ............ 710/107 |
| 5,712,754 | * | 1/1998 | Sides et al. ............ 361/58 |
| 5,777,834 | * | 7/1998 | Lehner et al. ............ 361/66 |
| 5,895,988 | * | 4/1999 | Shaffer et al. ............ 307/126 |
| 5,911,050 | * | 6/1999 | Egan et al. ............ 361/58 |
| 5,958,056 | * | 9/1999 | Lehmann ............ 713/310 |

OTHER PUBLICATIONS

Intel Corp., Pentium® Pro & Pentium® II Processors & Related Products: Databook, pp. 2–305 to 2–317 (Jan. 1998).

Intel Corp., Pentium® Pro Processor: Voltage Consideration for PCs, pp. 1–2, available at http://www.intel.com at least as early as Dec. 3, 1998.

* cited by examiner

Primary Examiner—Michael J. Sherry
Assistant Examiner—Kim Huynh
(74) Attorney, Agent, or Firm—Trop, Pruner & Hu, P.C.

(57) ABSTRACT

A system has one or more electronic devices and ports adapted to be coupled to the one or more electronic devices. Voltage regulators are each coupled to provide a voltage signal to a corresponding port. A decoder is coupled to the ports to detect if one of the ports is not coupled to an electronic device and to enable system operation even though one of the ports is not coupled to an electronic device and the voltage signal provided to the one port is not at a predetermined level.

19 Claims, 3 Drawing Sheets

APPARATUS FOR ENABLING SYSTEM OPERATION

This application is related to co-pending and commonly assigned U.S. patent application Ser. No. 09/258,236 entitled "METHOD OF ENABLING SYSTEM OPERATION," filed on Feb. 26, 1999.

BACKGROUND

The invention relates to enabling operation of a system such as a computer that includes a plurality of ports to receive electronic devices.

In a system such as a computer, electronic devices, such as microprocessors, microcontrollers, peripheral controllers, memory devices, and the like, are coupled to ports in the system. Such ports may include sockets, connectors, receptacles, surface mount connections, or other coupling mechanisms. For example, a system configurable to operate as a multiprocessor system may have multiple ports (e.g., sockets or connectors) to receive multiple microprocessors. Because of voltage and current requirements of many high performance microprocessors, a DC-to-DC converter (also referred to as a voltage regulation module or VRM), may be coupled to supply the operating voltage to a microprocessor. Typically, one VRM may be provided for each microprocessor in a multiprocessor system, with each VRM mounted in a corresponding socket or connector or directly mounted onto a circuit board in the system. Conventionally, a microprocessor provides some indication to a VRM specifying the voltage level to be provided by the VRM to the microprocessor.

Each VRM may provide a power good signal (typically an open collector signal) to indicate if the output voltage of the VRM is within a specified voltage range. Alternatively, some other type of indication that an output voltage is valid may be provided. If not, the power good signal or other voltage valid indication from the VRM may be driven inactive to prevent system operation. In a conventional multiprocessor system, power good signals from multiple VRMs may be tied together (to provide a wired AND of the power good signals) so that system operation is disabled if any of the power good signals is inactive. If for some reason one or more of the microprocessors are removed from their sockets or connectors, the VRMs associated with those microprocessors will drive their power good signal inactive. This will disable system operation even though one or more microprocessors remain in the system.

To overcome this issue, some system manufacturers mount VRMs in sockets so that if a microprocessor is removed for some reason, the corresponding VRM may also be removed so that system operation is not disabled by the presence of an inactive power good signal. However, this may increase the complexity of and overhead associated with reconfiguring a multiprocessor system, since two parts instead of one need to be added or removed. Thus, a need exists for an improved technique and apparatus to enable system operation even though one or more devices are removed.

SUMMARY

In general, according to one embodiment, a method of enabling system operation includes detecting if at least one of a plurality of ports is not occupied by a device and asserting an indication to enable system operation even if the at least one port is not occupied by the device.

In general, according to another embodiment, an apparatus to enable operation of a system having one or more electronic devices includes a decoder to determine whether one or more of a plurality of sockets in the system are coupled to an electronic device and if voltage is supplied to the sockets are within predetermined levels. A driver drives a signal to a predetermined state to enable system operation even though a socket is not coupled to an electronic device if the one or more voltage is supplied to the one or more other sockets coupled to electronic devices are within predetermined levels.

Other features and embodiments will become apparent from the following description and from the claims.

DETAILED DESCRIPTION

In the following description, numerous details are set forth to provide an understanding of the present invention. However, it is to be understood by those skilled in the art that the present invention may be practiced without these details and that numerous variations or modifications from the described embodiments may be possible.

According to some embodiments, in a system having multiple processors and voltage regulation modules (VRMs), a decoder coupled to the VRMs and one or more ports that receive processors is adapted to determine if any of the ports are unoccupied by a processor. The decoder may also determine if output voltages provided by the VRMs are within specified voltage ranges so that system startup may proceed. A VRM generates a voltage valid indication (e.g., a power good signal) if its output voltage is within a specified range. If the decoder detects that a socket is unoccupied, the decoder overrides an inactive status of the voltage valid indication provided by the VRM coupled to the unoccupied socket so that system operation is not disabled.

Although described embodiments include processors and VRMs, it is to be understood that the invention is not to be limited in this respect. For example, other types of voltage regulators besides VRMs may be utilized with processors. Further, in addition to or instead of voltage regulators, multiple clock generators that are coupled to multiple processors may provide indications that clocks have specified characteristics (e.g., frequencies) before system operation may proceed. In addition, electronic devices other than processors may be used in conjunction with further embodiments of the invention. In such embodiments, the devices (e.g., voltage regulators or clock generators) coupled to provide inputs to one or more processors or other devices may also provide indications that the inputs are valid.

In one embodiment, sockets are adapted to receive processors that include general-purpose or special-purpose processors such as microprocessors, microcontrollers, application specific integrated circuits (ASICs), programmable gate arrays (PGAs), or other control devices. In alternative embodiments, the sockets may be adapted to receive other types of electronic devices, such as memory devices, peripheral controllers or cards, or other devices.

Figure 1:
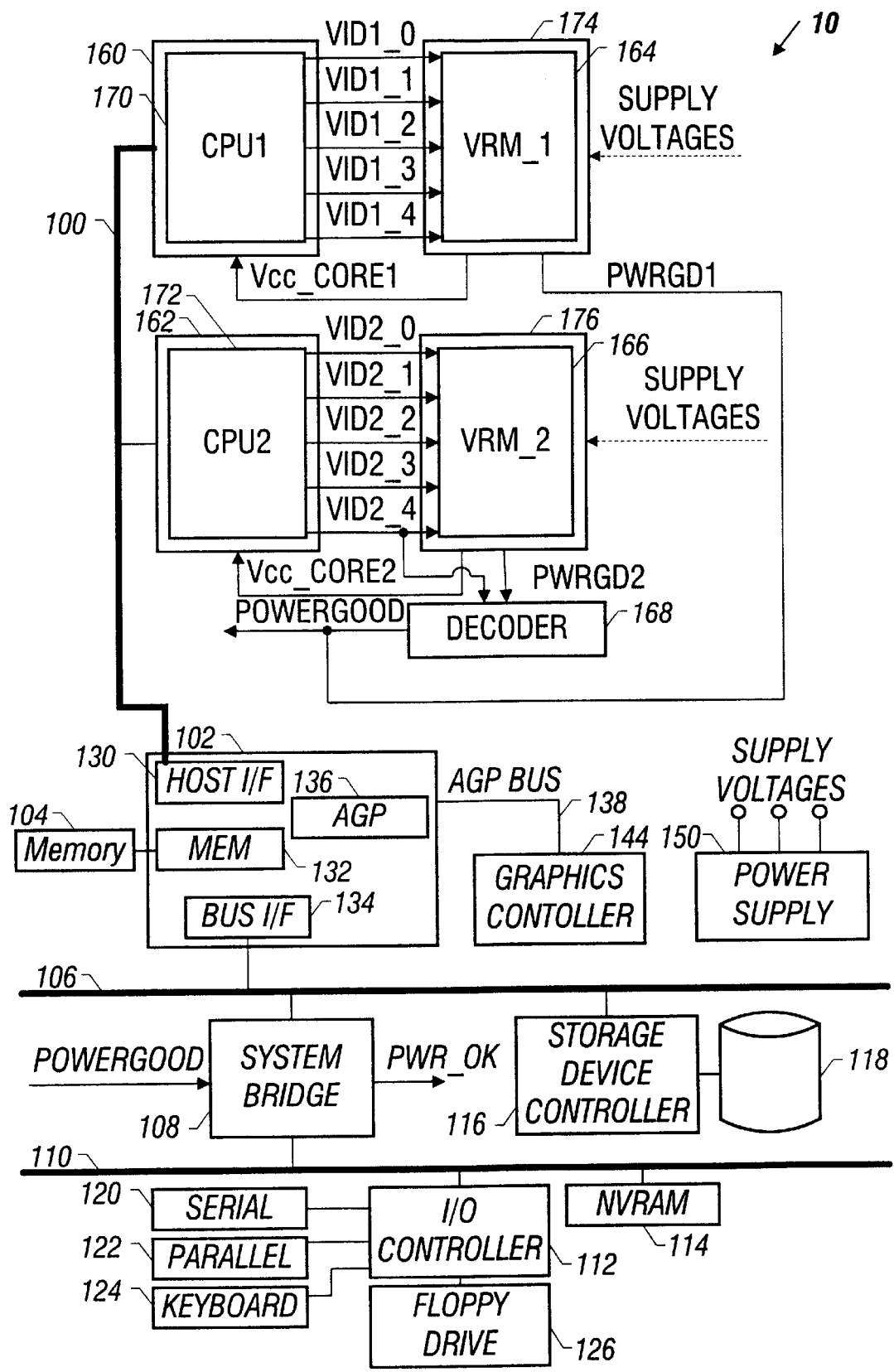
FIG. 1 is a block diagram of an embodiment of a system having multiple processors and voltage regulation modules.

Referring to FIG. 1, according to one embodiment, a system 10 that is configurable as a multiprocessor system includes two ports 160 and 162 that are capable of receiving two central processing units (CPUs) 170 and 172, respectively. In further embodiments, more than two CPUs may be included in the system 10. The CPUs 170 and 172 may be powered by voltages VCC_CORE1 and VCC_CORE2, respectively.

The CPUs 170, 172 may include any one of the processors referenced above. The ports 160, 162 may include sockets, connectors, receptacles, surface mount connections, or other coupling mechanisms. The system 10 may, by way of example, include a computer, a hand-held computing device, a set-top box, an appliance, a game system, or any other controller-based system in which the controller may be a programmable device such as a microprocessor, microcontroller, ASIC, PGA, and the like.

The voltages VCC_CORE1 and VCC_CORE2 are provided by respective voltage regulation modules (VRMs) 164 and 166, which may be DC-to-DC converters as described in VRM 8.3 DC—DC Converter Design Guidelines, published by Intel Corporation. In further embodiments, other types of voltage regulators may be used. The VRMs 164, 166 may be coupled to ports 174, 176, respectively, which may also include sockets, connectors, receptacles, surface mount connections, or other coupling mechanisms. The VRMs 164, 166 may receive supply voltages from a power supply 150 in the system 10.

The VRMs 164, 166 output specified voltage levels to respective CPUs 170, 172 based on voltage level indications from the CPUs 170, 172. In the illustrated embodiment, the voltage level indications provided by the CPUs 170, 172 may include voltage identification (VID) signals, e.g., signals VID1_[0:4] from the CPU 170 and signals VID2_[0:4] from the CPU 172.

Based on the values of signals VID1_[0:4] and VID2_[0:4], the VRMs 164, 166 maintain output voltages VCC_CORE1 and VCC_CORE2, respectively, at specified levels. For example, with some Pentium® processors such as Pentium® II or Pentium® Pro processors from Intel Corporation, the specified voltage levels on VCC_CORE1 and VCC_CORE2 may range between about 1.8 and 3.5 volts. If a CPU 170 or 172 is not occupying a respective port 160 or 162, then the VID signals from the unoccupied port are set to a predetermined value; for example, the VID signals may all be tied high by pull-up resistors.

According to some embodiments, the number of processors that may be included in the system 10 may be varied. For example, the system 10 may be configured as a uniprocessor system, in which case the CPU 170 may occupy port 160 while the port 162 remains unoccupied. The system 10 may also be configured as a multiprocessor system, in which case both processors 170, 172 are coupled to respective ports 160, 162. If additional ports are available, additional processors may be added to the system.

The CPUs 170, 172 may be coupled over a host bus or front side bus 100 to a host bridge 102. The host bridge 102 may include ports to various devices, including a memory 104, a system or primary bus 106, and a graphics controller 144. The system or primary bus 106 may include a Peripheral Component Interconnect (PCI) bus as defined in the PCI Local Bus Specification, Production Version, Revision 2.1, dated June 1995. The graphics controller 144 may operate according to the Accelerated Graphics Port (AGP) Interface Specification, Revision 2.0, dated May 1998. The host bridge 102 may include a host interface 130 coupled to the processor bus 100, a memory controller 132 coupled to the memory 104, an AGP interface 136 coupled to the graphics controller 144 over an AGP bus 138, and a bus interface 134 coupled to the system bus 106.

The system bus 106 may be coupled to various devices, including a storage device controller 116 that controls access to one or more storage devices 118, such as a hard disk drive, a compact disk (CD) or digital video disk (DVD) drive, or other types of storage devices. Optionally, the system bus 106 may also be coupled to a network interface card (not shown) for coupling to a network.

The system 10 may also include an expansion or secondary bus 110, which may operate in conformance with an Industry Standard Architecture (ISA) Specification, an Extended Industry Standard Architecture (EISA) Specification, a Microchannel Architecture (MCA) Specification, or other specifications and standards. A system bridge 108 is located between the system bus 106 and the expansion bus 110. For example, if the expansion bus is an ISA bus, then the system bridge 108 may be a PIIX4 PCI-to-ISA/IDE accelerator chip from Intel Corporation.

Coupled to the expansion bus may be an input/output (I/O) controller 112 having interfaces to various devices, including for example, a serial port 120, a parallel port 122, a keyboard 124, and a floppy disk drive 126. A non-volatile memory 114 may also be coupled to the expansion bus 110, which may include an erasable and programmable read-only memory (EPROM), electrically erasable and programmable read-only memory (EEPROM), flash memory, battery-backed random access memory, or the like. The nonvolatile memory 114 may store start-up routines, such as basic input/output system (BIOS) routines, for booting and initializing the system 10.

Other configurations and architectures of the system 10 may be possible. For example, a lesser or greater number of buses may be included. Further, instead of the host bridge 102 and system bridge 108, the system 10 may include a memory hub (coupled to the main memory 104, host bus 100, and AGP bus 138) and an I/O hub including bridge controllers coupled to the system bus 106 and expansion bus 110.

The VRMs 164 and 166 output respective signals PWRGD1 and PWRGD2 to indicate if output voltages VCC_CORE1 and VCC_CORE2 are within voltage ranges specified by VID signals from the CPUs 170 and 172. In one embodiment, the PWRGD1 and PWRGD2 signals may be open collector signals that are driven to an active state (e.g., a high state) to indicate that VCC_CORE1 and VCC_CORE2, respectively, are within specified ranges. However, if VCC_CORE1 or VCC_CORE2 is outside a specified voltage range, then PWRGD1 or PWRGD2 is driven inactive (e.g., a low state).

To allow continued operation of the system 10 even if one of the CPUs 170 and 172 is not present in its socket, a decoder 168 according to one embodiment receives the output PWRGD2 of the second VRM 166 as well as signals VID2_[0:4] from the port 162. The output of the decoder 168 (which in one embodiment may be an open collector output) is coupled to a signal POWERGOOD. The signal POWERGOOD is also tied to the signal PWRGD1 from the first VRM 164. In effect, according to the illustrated embodiment, a wired AND is performed of PWRGD1 and the output of the decoder 168.

In a multiprocessor configuration, in which both CPUs 170 and 172 are present in their respective ports 160 and 162, the decoder 168 allows the state of the signal PWRGD2 to be passed through to the decoder output. Thus, in this configuration PWRGD1 and PWRGD2 are allowed to indicate whether voltage outputs from respective VRMs 164 and 166 are within specified ranges. If the output voltages of both VRMs 164 and 166 are valid, then PWRGD1 and PWRGD2 are driven high to drive POWERGOOD high. In one embodiment, the signal POWERGOOD is provided to the system bridge 108 which allows the system 10 to power up if the signal POWERGOOD is driven high.

In a uniprocessor configuration in which the second CPU 172 is not present in the port 162, the VID2_[0:4] signals are all tied high in one embodiment and, as a result, the second VRM 166 maintains PWRGD2 inactive (e.g., low). The decoder 168 detects that the CPU 172 is not present by decoding the signals VID2_[0:4]. If the CPU 172 is not present, then the decoder 168 overrides the inactive state of PWRGD2 by driving the decoder output active. Thus, in a uniprocessor configuration, POWERGOOD is allowed to be activated if PWRGD1 is active even though PWRGD2 remains inactive.

In another embodiment, the decoder 168 may alternatively receive signals PWRGD1 and VID1_[0:4] instead of PWRGD2 and VID2_[0:4] to detect whether the first CPU 170 is present in the port 160. In yet another embodiment, both sets of signals PWRGD1, PWRGD2 and VID1_[0:4], VID2_[0:4] may be received by the decoder 168. In further embodiments, signals from additional processors and VRMs may be received by the decoder 168.

The decoder 168 may be implemented with discrete combinatorial logic or in a programmable array logic (PAL) device or other programmable device. Logic such as that described in connection with FIG. 2 below or equivalents thereof may be programmed into such programmable devices. Alternatively, the decoder 168 may be integrated into another device in the system 10, such as the host bridge 102 or the system bridge 108, which may be implemented with programmable devices such as ASICs or PGAs.

Figure 2:
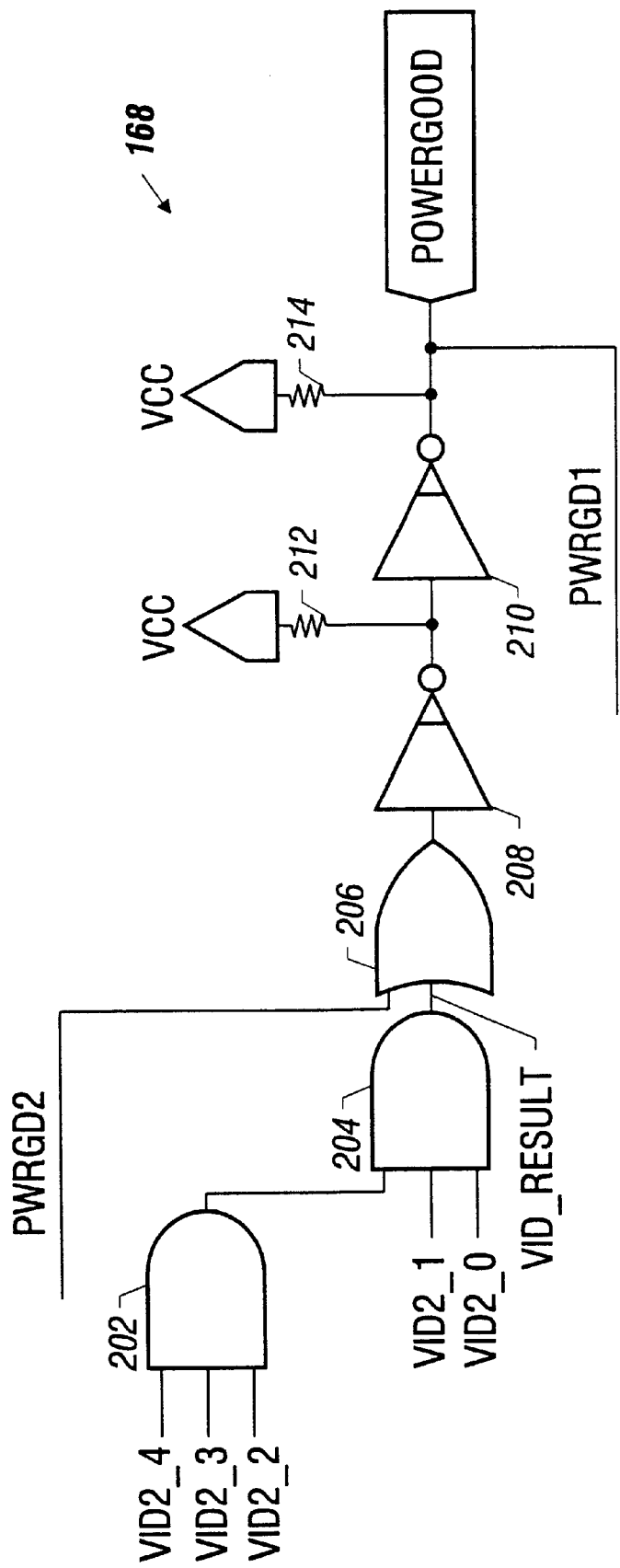
FIG. 2 is a logic diagram of circuitry according to an embodiment in the system of FIG. 1.

Referring to FIG. 2, logic in the decoder 168 according to one embodiment is illustrated. The decoder 168 may include AND gates 202 and 204 that receive signals VID2_[0:4] from the port 162. If the CPU 172 is present in the port 162, then the signals VID2_[0:4] are driven to one of several possible values by the CPU 172 to specify the voltage level of VCC_CORE2. If the CPU 172 is not present, however, then the signals VID2_[0:4] may be tied to a specific value, such as all high states, by resistors, for example.

The output (VID_RESULT) of the AND gate 204 is coupled to one input of an OR gate 206 whose other input receives the signal PWRGD2 from the VRM 166. The output of the OR gate 206 is coupled to the input of an inverter 208 having an open collector output that is tied high (to voltage VCC, for example) by a pull-up resistor 212 if the inverter 208 is inactive. The output of the inverter 208 is also coupled to the input of an inverter 210 also having an open collector output. The output of the inverter 210 is tied high by a pull-up resistor 214 and is coupled to the POWERGOOD signal. The signal PWRGD1 from the first VRM 164 is also tied to the signal POWERGOOD so that POWERGOOD is the result of a wired AND operation between the inverter 210 output and PWRGD1.

If the CPU 172 is present, then the output VID_RESULT is driven to a low state to allow the state of PWRGD2 to be passed through the OR gate 206 and inverters 208 and 210 to the POWERGOOD signal. However, if the CPU 172 is not present in the port 162, then the VID_RESULT output of the AND gate 204 is maintained high to override the inactive state of PWRGD2. VID_RESULT being high causes the OR gate 206 to drive its output high, which causes the inverter 208 to drive its output low, which in turn causes the inverter 210 to be inactive. In this configuration, the state of POWERGOOD is determined only by PWRGD1.

In other embodiments, different combinations of gates may receive the VID signals to determine if the CPU 172 is present. The combination of gates is dependent on the value or values of VID signals (or other indication) that indicate that the CPU 172 is not present.

Figure 3:
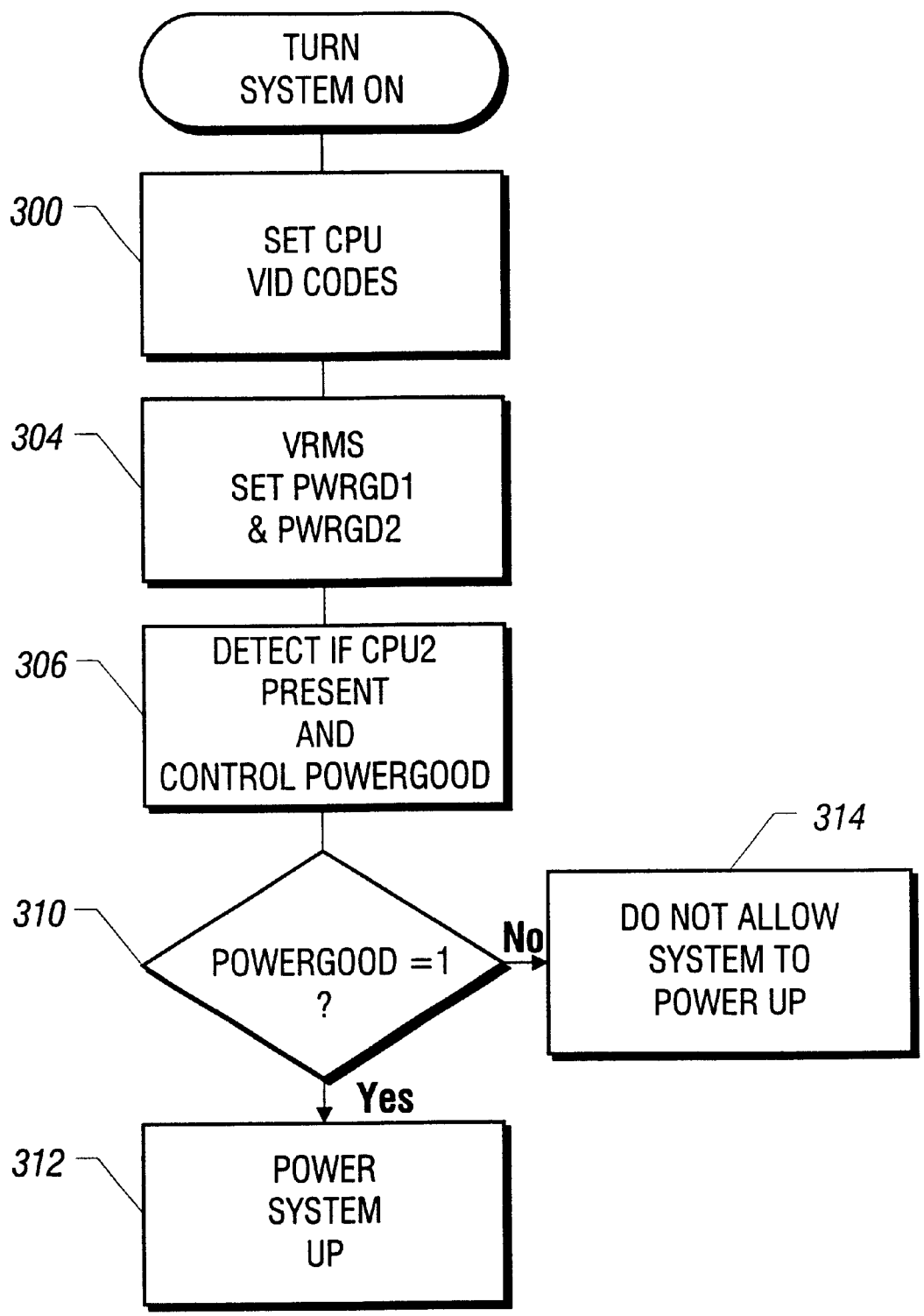
FIG. 3 is a flow diagram illustrating a sequence of events and actions performed in the system of FIG. 1.

Referring to FIG. 3, a sequence of events and actions performed in the system 10 according to one embodiment is illustrated. After the system power has turned on, the CPUs 170 and 172 (if they are present) drive (at 300) their respective VID signals to predetermined states. The VID values may be programmed in non-volatile storage locations in the CPUs 170 and 172. The programmed values are driven by the CPUs 170 and 172 onto signals VID1_[0:4] and VID2_[0:4]. If one of the CPUs is not present, e.g., CPU 172, then the VID signals corresponding to the absent CPU are tied to predetermined states.

Based on the values of VID1_[0:4] and VID2_[0:4], the VRMs 164 and 166 set (at 304) their output voltages VCC_CORE1 and VCC_CORE2 and drive respective signals PWRGD1 and PWRGD2 active if the output voltages are within specified ranges. If the CPU 172 is not present, the signal PWRGD2 is maintained in an inactive state. The decoder 168 detects (at 306) the absence of the second CPU 172 by decoding the signals VID2_[0:4]. If the CPU 172 is not present, then control of POWERGOOD is based only on PWRGD1. However, if both CPUs 170 and 172 are present, then POWERGOOD is based on both PWRGD1 and PWRGD2.

Next, according to one embodiment, the system bridge 108 determines (at 310) whether the POWERGOOD signal is active or inactive. If inactive, the system bridge 108 prevents the system 10 from powering up (at 314). For example, this may be done by setting a signal PWR_OK to an inactive state to prevent other devices in the system from powering up. However, if the signal POWERGOOD is active, indicating that the voltages of the CPU 170 and CPU 172 (if it exists) are within specified ranges, then the signal PWR_OK may be driven active (at 312) to allow power up of system devices.

Thus, the system 10 is allowed to power up if both the first and second CPUs 170 and 172 are present in their respective ports 160 and 162 and the output voltages of VRMs 164 and 166 are within specified ranges. Alternatively, the system 10 is allowed to power up even if the second CPU 172 is absent provided that the first CPU 170 is present and the VRM 164 is driving the output VCC_CORE1 to within its specified range as determined by the VID1 signals.

Some embodiments of the invention allow the PWRGD outputs of VRMs to be effectively tied together without causing the system not to power up when a CPU is absent from one of the processor ports. The decoder used to monitor the states of PWRGD1, PWRGD2, and the VID signals do not compromise the true function of the POWERGOOD signal; that is, if the second CPU 172 is present, the state of POWERGOOD is allowed to track the states of both PWRGD1 and PWRGD2 so that POWERGOOD is high only if both PWRGD1 and PWRGD2 are high.

Advantages offered by some embodiments of the invention may include one or more of the following. Flexibility is provided since the system 10 may be configurable either as a uniprocessor or multiprocessor system without having to remove the VRM for a processor that has been removed. User intervention in adding a second CPU may be reduced since the user does not need to set jumpers or switches to enable operation after adding the second CPU. The relatively simply logic used to implement some embodiments of the invention may be relatively low cost.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A system having one or more electronic devices, comprising:

a plurality of ports to receive the one or more electronic devices, a first port being unoccupied and at least one other port being occupied;

a plurality of voltage regulators each adapted to provide a voltage signal to a corresponding port; and a decoder adapted to detect the first port being unoccupied and to detect if the voltage signal of the at least one other port is at a valid level, the decoder adapted to further provide a system enabling indication to enable system operation if the voltage signal of the at least one other port is at the valid level even though the first port is unoccupied.

2. The system of claim 1, wherein the one or more electronic devices comprise processors.

3. The system of claim 1, wherein the voltage regulators comprise DC-to-DC converters.

4. The system of claim 1, wherein the system enabling indication comprises a system power good signal being at an active state.

5. The system of claim 1, wherein each voltage regulator is adapted to provide a voltage valid indication or a voltage not valid indication to indicate whether the voltage signal provided to a corresponding port is at the valid level.

6. The system of claim 5, wherein the decoder is adapted to override a voltage not valid indication from a voltage regulator associated with the unoccupied first port.

7. The system of claim 6, wherein the decoder is adapted to provide the system enabling indication based on the voltage valid indication from the at least one other port.

8. The system of claim 1, wherein the decoder is adapted to receive a first signal from each voltage regulator to indicate whether the voltage signal of the voltage regulator is within a predetermined range, the decoder adapted to further receive a second indication from each port indicating whether the port is occupied by an electronic device.

9. The system of claim 8, wherein the decoder is adapted to allow a state of the first signal associated with the at least one other port to control providing of the system enabling indication.

10. The system of claim 8, wherein the decoder is adapted to override an inactive state of the first signal associated with the unoccupied first port.

11. A system configurable to have a different number of processors, comprising:

sockets to receive the processors;

devices each adapted to provide an input to a corresponding processor and to provide a voltage valid signal at an active state if a state of the input is valid, each device adapted to provide the voltage valid signal at an inactive state if the state of the input is not valid; and a decoder to detect if a socket is unoccupied and to override the inactive state of the voltage valid signal if so.

12. The system of claim 11, wherein the devices include voltage regulators.

13. The system of claim 12, wherein the input includes supply voltages.

14. Apparatus to enable operation of a system having one or more electronic devices, the apparatus comprising:

a device to determine whether a plurality of sockets in the system are coupled to an electronic device and if voltages supplied to the sockets are within a predetermined range; and a driver to drive a signal to a predetermined state to enable system operation even though a socket is not coupled to an electronic device if the one or more voltages supplied to the one or more other sockets coupled to electronic devices are within the predetermined range.

15. The apparatus of claim 14, wherein the voltages include power supply voltages.

16. The apparatus of claim 14, wherein the device is adapted to receive an indication of whether each socket is coupled to an electronic device.

17. The apparatus of claim 14, wherein the device is adapted to receive voltage valid signals associated with the sockets to indicate whether each corresponding voltage is within the predetermined range.

18. The apparatus of claim 17, wherein the device is adapted to override an inactive state of a voltage valid signal of a socket not coupled to an electronic device.

19. A system having one or more electronic devices, comprising:

ports adapted to be coupled to one or more electronic devices;

voltage regulators each coupled to provide a voltage signal to a corresponding port and to provide a voltage valid signal; and a decoder to override an inactive state of the voltage valid signal from a voltage regulator corresponding to a port that is not coupled to an electronic device.

* * * * *